United States Patent
Iida et al.

[19]

[11] Patent Number: 6,111,841

[45] Date of Patent: Aug. 29, 2000

[54] APPARATUS FOR AND METHOD OF CONTROLLING PLAYBACK LIGHT INTENSITY FOR AN OPTICAL RECORDING MEDIUM

[75] Inventors: Haruhisa Iida, Kawasaki; Hiroyuki Matsumoto, Tokyo, both of Japan

[73] Assignee: Nikon Corporation, Tokyo, Japan

[21] Appl. No.: 08/780,375

[22] Filed: Jan. 8, 1997

[30] Foreign Application Priority Data

Jan. 10, 1996 [JP] Japan ..................................... 8-002291
Jan. 10, 1996 [JP] Japan ..................................... 8-002303

[51] Int. Cl.$^7$ ....................................................... G11B 7/00
[52] U.S. Cl. .............................. 369/116; 369/47; 369/54
[58] Field of Search ............................... 369/54, 58, 32, 369/13, 116, 124, 47

[56] References Cited

U.S. PATENT DOCUMENTS

| | | | |
|---|---|---|---|
| 5,182,742 | 1/1993 | Ohmori et al. | 369/116 |
| 5,249,172 | 9/1993 | Hagihara et al. | 369/116 |
| 5,329,512 | 7/1994 | Fukimoto et al. | 369/121 |
| 5,390,162 | 2/1995 | Fukumoto et al. | 369/116 |
| 5,398,227 | 3/1995 | Miyaoka et al. | 369/54 |
| 5,410,527 | 4/1995 | Ashinuma et al. | 369/116 |
| 5,418,770 | 5/1995 | Ide et al. | 369/116 |
| 5,513,165 | 4/1996 | Ide et al. | 369/116 |
| 5,513,166 | 4/1996 | Tokumitsu et al. | 369/54 |
| 5,612,939 | 3/1997 | Ueki et al. | 369/116 |
| 5,617,400 | 4/1997 | Fuji | 369/116 |
| 5,623,458 | 4/1997 | Matsumoto et al. | 369/13 |
| 5,642,343 | 6/1997 | Toda et al. | 369/116 |
| 5,699,342 | 12/1997 | Yagi et al. | 369/116 |
| 5,703,841 | 12/1997 | Hiroki et al. | 369/116 |
| 5,726,954 | 3/1998 | Matsumoto et al. | 369/13 |
| 5,774,429 | 6/1998 | Nishimura | 369/13 |

FOREIGN PATENT DOCUMENTS

| | | | |
|---|---|---|---|
| 62-154250 | 7/1987 | Japan | 369/116 |
| 2-91817 | 3/1990 | Japan | 369/116 |

*Primary Examiner*—Nabil Hindi

[57] ABSTRACT

A recording and playback device having a recording and playback controller that determines a temperature of a recording and playback medium. The controller determines the temperature by finding a recording light intensity at which a duty ratio of a playback light signal matches a duty ratio of the data to be recorded and estimating the temperature based on the recording light intensity. The controller may also determine the temperature by measuring the temperature with a temperature sensor. Based on the temperature, the recording and playback device calculates a playback light intensity at which a temperature distribution remains constant in a portion of the recording and playback medium illuminated by a playback light having the playback light intensity when the temperature of the recording and playback medium changes. The recording and playback controller also adjusts the playback light intensity based on a linear velocity of the recording and playback medium.

15 Claims, 5 Drawing Sheets

APPARATUS FOR AND METHOD OF CONTROLLING PLAYBACK LIGHT INTENSITY FOR AN OPTICAL RECORDING MEDIUM

CROSS REFERENCE TO RELATED APPLICATIONS

This application is based upon and claims priority from Japanese Patent Application Nos. 08-002291, filed Jan. 10, 1996 and 08-002303, filed Jan. 10, 1996, the contents of each being incorporated herein by reference.

BACKGROUND OF THE INVENTION

1. Field of the Invention

The present invention relates to a data recording and playback device which records and reads out data from an optical recording medium, and a playback method of reading out data from an optical recording medium.

2. Description of the Related Art

Optical recording media which can accumulate high density data and which are capable of data processing at high speeds are attracting attention for audio and imaging uses, as well as for computer memory use. CDs, that are exclusively used for readout, are rapidly spreading for audio and computer uses. Moreover, 5.25 inch and 3.5 inch diameter (and the like) optical disks, on which it is possible to write data once (the "write once type"), and rewriteable types of magneto-optical disks, are standardized by ISO standards and are expected to be widely used also. Moreover, as for rewriteable optical disks, the phase change type has also started to appear on the market. Among such recording and playback devices, there is a strong desire to increase data storage capacity and to record and play back data at high density. Various investigations have been carried out for these purposes.

Figure 5:
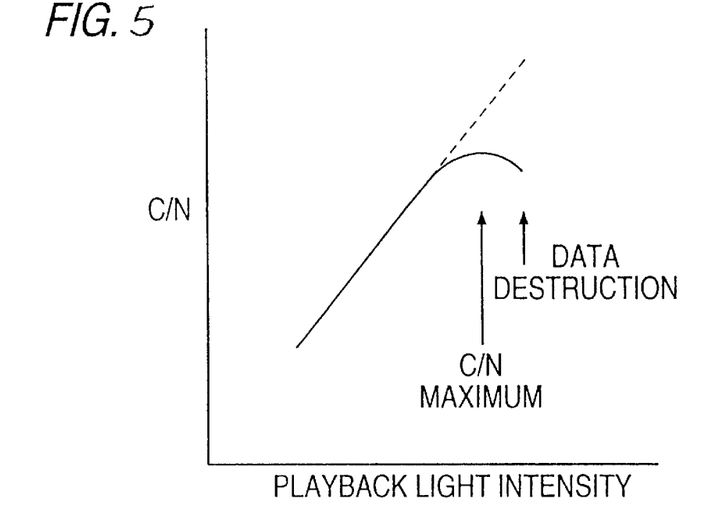
FIG. 5 is a graph showing the change in the C/N ratio of a playback signal with respect to a playback light intensity.

Playback light illuminates an optical recording medium from a playback device. When the intensity of the playback light increases (as shown in FIG. 5), the carrier to noise (C/N) ratio of the playback signal increases to some degree, corresponding to an increase of the amount of playback light which returns to the photodetector. However, when the playback light intensity is increased beyond a certain point corresponding to a C/N ratio maximum, due to a temperature rise of the medium, the C/N ratio begins to fall, due to a decrease of the Kerr rotation angle. Any further increase in the playback light intensity leads to the recorded data being destroyed (such as at the point identified by the data destruction arrow depicted in FIG. 5). In other words, the optimum intensity of playback light is present when the highest C/N ratio is obtained. Thus, in order to satisfy the requirement that information be recorded at high density and to exploit the maximum recording capacity of the medium, it is desirable to set the playback light intensity optimally to the best possible limits while addressing the increase of the C/N ratio of the playback signal.

Methods were attempted for making possible the playback of data which was recorded at high density by making the wavelength of the light source of the optical head short and using a small light spot for playback. But, the wavelength of the semiconductor laser used as a light source is limited. Moreover, at short wavelengths of the laser, there are problems of insufficient form or output of the laser light. Consequently, a medium was developed for super resolution readout use which can play back data recorded at high density, even if the present state of the wavelength of the light source and the size of the light spot used for playback stayed the same. In such a method, a portion of the signal of the medium which has entered the light spot is masked so that it is not detected as a playback signal by using a temperature distribution of the medium in the light spot arising from the combination of the temperature rise of the medium due to the playback light and from the rotational movement of the medium. As a result, the effective open aperture region which can read out a signal becomes smaller than the light spot, and playback of higher density data becomes possible.

Figure 6A:
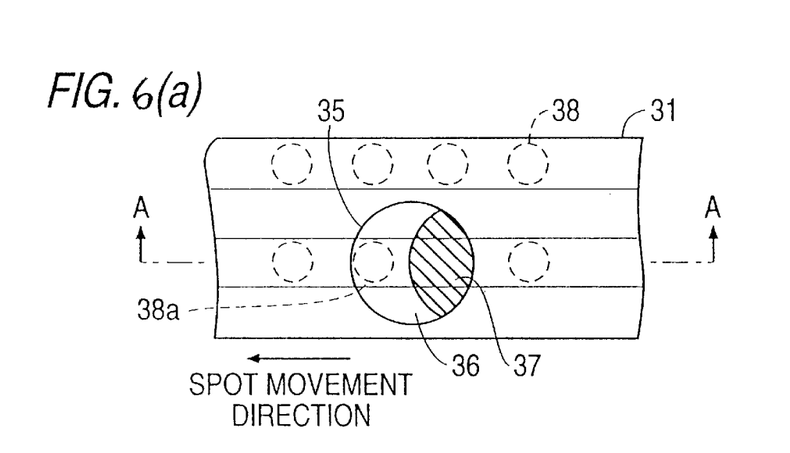
FIG. 6(a) is a planar view of an optical recording medium of a FAD system for super resolution readout use.
Figure 6B:
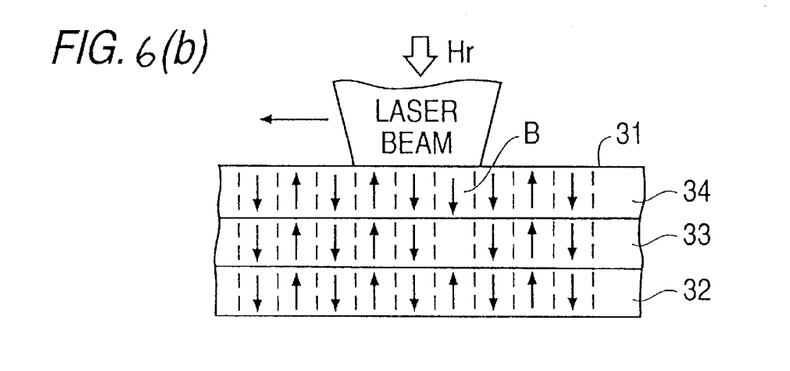
FIG. 6(b) is a cross-sectional view of the optical recording medium depicted in FIG. 6(a), taken along the A—A line in FIG. 6(a).

Front Aperture Detection (FAD), which is an example of such a super resolution readout method, will be briefly described using FIGS. 6(a) and 6(b). FIG. 6(a) is a planar view of an optical recording medium used with a FAD system. FIG. 6(b) is a cross section at line A—A of FIG. 6(a). The medium 31, in accordance with a FAD system and method, is provided with three layers: a recording layer 32 made of, for example, TbFeCo; a disconnection layer 33 made of, for example, TbFe, and a playback layer 34 made of, for example, GdFeCo. Signal playback is performed from the playback layer side. The direction of magnetization of each layer in the initial state is as shown in FIG. 6(b). The direction of magnetization of the disconnection layer 33 and the playback layer 34 follow the direction of the recording layer 32 on which data (record marks 38) has been recorded. This is because exchange coupling forces act between mutually contacting layers.

An external magnetic field Hr is applied during playback of data. When a playback light spot 35 (as shown in FIG. 6(a)) moves relatively with respect to the medium 31, the region in the forward direction of the medium 31 introduced into the light spot 35 becomes a low temperature region 36, and the region in the rearward direction becomes a high temperature region 37, so that a temperature difference arises. Then, when the temperature of the high temperature region 37 reaches a temperature (Curie point) which erases the magnetization of the disconnection layer 33, the coupling of the magnetization of the playback layer 34 and the recording layer 32 via the disconnection layer 33 is cut off. In this manner, the magnetization of the playback layer 34 is reversed in the direction of the external magnetic field Hr (the direction of magnetization at the location B in FIG. 6(b) is reversed). That is, in the high temperature region 37, the magnetization of the playback layer 34 shows a constant state, regardless of whether there is a mark 38, and the high temperature region 37 becomes a mask which does not contribute to signal playback. On the other hand, only the low temperature region 36 which retains the recorded state provides an effective aperture for signal detection in the light spot 35. Accordingly, only the record mark 38a within the low temperature region 36 is read out.

In a medium for super resolution readout use, other than a medium for the FAD system, a Rear Aperture Detection (RAD) system and a Center Aperture Detection (CAD) system, having marks which remain in the open aperture of only the high temperature regions, are also known in the art.

The medium of the RAD system has a recording layer and a playback layer formed on it. By use of an initializing magnetic field, the direction of magnetization of the playback layer is made uniform in a constant direction. When illuminated by a light spot, the direction of magnetization of the playback layer reverses to the direction of magnetization of the playback layer in the high temperature region within the light spot by the exchange coupling force, and functions as an effective aperture for signal detection. Moreover, in the low temperature region, the direction of magnetization of the playback layer has the initial state and functions as a mask. Thus, super resolution readout is achieved in the RAD system.

A medium of the CAD system is provided with a recording layer and a playback layer which exhibits magnetization within the plane at a low temperature (horizontal direction of magnetization) and perpendicular magnetization at a high temperature. When the light spot illuminates the medium of a CAD system, the direction of magnetization of the playback layer, in the high temperature region close to the center within the spot, becomes the same direction as in the recording layer and functions as an effective aperture for signal detection. Moreover, in regions outside the high temperature region, the direction of magnetization of the playback layer is the unchanged magnetization in the plane. Because the magnetization in the plane does not confer a Kerr effect with respect to the perpendicular incident light, a mask effect is achieved. Thus, super resolution readout is achieved in the CAD system.

Accordingly, principles of the mask formation are represented by a method using the change of magnitude of the magnetic coupling force or the coercive force, or a method using the change of transmissivity due to phase change, and the like.

However, in the above-described methods for super resolution readout, the intensity of playback light which illuminates the optical recording medium from a playback device remains constant and has no relationship to the temperature of the medium and its surroundings. In the above-described mediums for super resolution readout use, when the temperature of the medium itself changes, even though illuminated with the same intensity of playback light, the temperature distribution of the medium within the light spot changes, and the above-described form of the effective aperture changes. Accordingly, when the temperature of the medium itself changed, the super resolution effect obtained may be inferior and readout errors may occur.

Moreover, in a normal medium (not a medium for use in super resolution readout), when the temperature of the medium itself changes, the C/N ratio of the playback signal changes, due to the aforementioned change in temperature distribution. Consequently, even though the playback light intensity was optimally set so as to obtain the highest possible C/N ratio, the best use could not be made of the capacity of the medium at constant playback light intensity because there was a fall in the C/N ratio when the temperature of the medium itself changed.

Furthermore, when the temperature of the optical recording medium was made normally constant on the playback device side, the established environmental temperature of the playback device was limited, countermeasures became necessary for the heat generated within the device, and the device became bulky.

SUMMARY OF THE INVENTION

Accordingly, it is an object of the present invention to make the temperature distribution of the recording and playback medium within the playback light spot to be less susceptible to temperature variations.

It is a further object of the present invention to appropriately adjust the light intensity of the playback light to achieve the optimum C/N ratio for the playback signal even if the temperature of the recording and playback medium changes.

It is another object of the present invention to set the temperature distribution of the recording and playback medium within the playback light spot to a predetermined temperature unrelated to the temperature of the medium itself.

It is yet another object of the present invention to maintain an optimal form for the effective aperture in the playback light spot despite temperature variations in the recording and playback medium and its surroundings.

It is yet a further object of the present invention to obviate the necessity to use bulky or complicated countermeasures in the data recording and playback device to compensate for the effects of the temperature variations In the recording and playback medium and its surroundings.

Objects of the present invention are achieved by providing a data recording and playback device for recording and playing back data on a recording and playback medium which has a recording and playback controller to determine a playback light intensity at which a temperature distribution remains constant in a portion of the recording and playback medium illuminated by a playback light having the playback light intensity when a temperature of the recording and playback medium changes.

Objects of the present invention are also achieved by providing a data recording and playback device having an illumination device, a reflected light monitor, and a recording and playback controller to determine a playback light intensity at which a temperature distribution remains constant in a portion of the recording and playback medium illuminated by a playback light having the playback light intensity when a temperature of the recording and playback medium changes. The illumination device illuminates the recording and playback medium with a recording light to record the data on the recording and playback medium or with the playback light to read out data from the recording and playback medium. The reflected light monitor receives a reflected playback light from the recording and playback medium and generates an electrical signal corresponding to the reflected playback light. The recording and playback controller determines a recording light intensity of the recording light based on the electrical signal from the reflected light monitor during a test recording and playback operation on the recording and playback medium, estimates a temperature of the recording and playback medium based on the recording light intensity, and calculates the appropriate playback light intensity of the playback light based on the estimated temperature. During the test recording and playback operation, the recording and playback controller finds the recording light intensity at which a duty ratio of the reflected playback light matches the duty ratio of the data to be recorded by recording test data on the recording and playback medium, playing back the test data, and changing the recording light intensity if the duty ratio of the playback signal is greater or less than the duty ratio of the data to be recorded. The recording and playback controller may also adjust the playback light intensity based on a linear velocity of the recording and playback medium.

Objects of the present invention are also achieved by providing a data recording and playback device having a recording and playback controller that obtains a temperature of a recording and playback medium by using a temperature sensor and, based on the detected temperature, calculates a playback light intensity at which a temperature distribution remains constant in a portion of the recording and playback medium illuminated by a playback light having the playback light intensity when a temperature of the recording and playback medium changes. The temperature sensor may be a non-contact type of infrared temperature sensor or a contact-type sensor. The temperature may be obtained by detecting a thermal expansion of the surface of the medium or detecting a color of a thermo-label whose color changes with temperature. The temperature may also be estimated by measuring the temperature of the space surrounding the recording and playback device, the temperature of a hub, cartridge, or other part belonging to the medium not used for recording and playback of data.

Objects of the present invention are also achieved by providing a method of data playback from a recording and playback medium which determines a playback light intensity at which a temperature distribution remains constant in a portion of the recording and playback medium illuminated by a playback light having the playback light intensity when the temperature of the recording and playback medium changes. In determining the playback light intensity, the method of data playback from a recording and playback medium may obtain the temperature of the recording and playback medium by using a temperature sensor or by finding a recording light intensity at which a duty ratio of a playback light signal that matches the duty ratio of the data to be recorded and estimating a temperature of the recording and playback medium based on the recording light intensity. Based on the measured or estimated temperature, the method calculates a playback light intensity at which a temperature distribution remains constant in a portion of the recording and playback medium illuminated by a playback light having the playback light intensity when the temperature of the recording and playback medium changes.

BRIEF DESCRIPTION OF THE DRAWINGS

These and other objects and advantages of the invention will become apparent and more readily appreciated from the following description of the preferred embodiments, taken in conjunction with the accompanying drawings.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
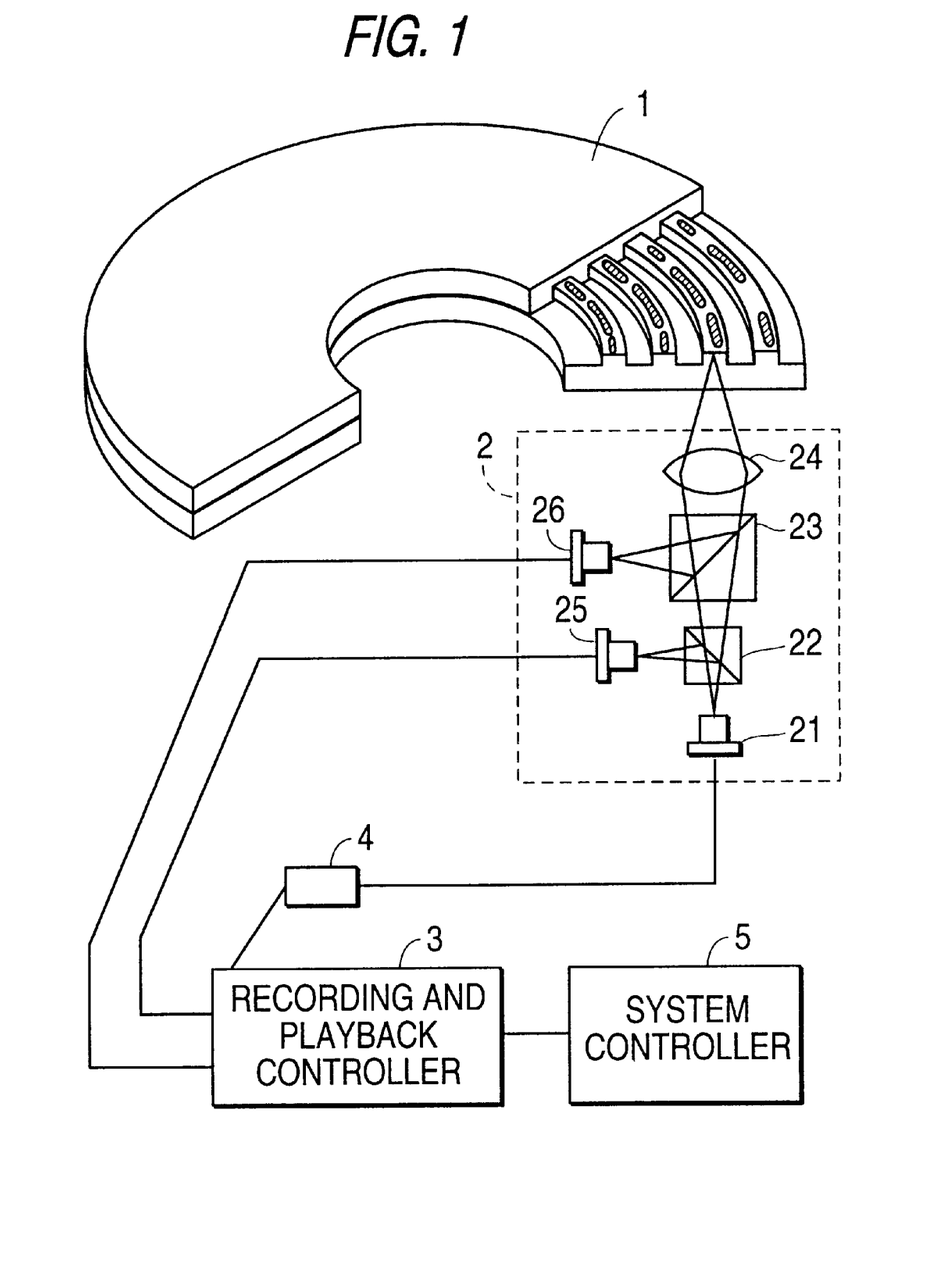
FIG. 1 is a block diagram depicting a data recording and playback device according to a first preferred embodiment of the present invention.

FIG. 1 is a block diagram of a data recording and playback device according to a first preferred embodiment of the present invention. A recording and playback controller 3 has recording and playback control means for performing recording and playback signal processing and for controlling a laser light to illuminate an optical recording medium 1 from a semiconductor laser 21 within an optical head 2. A laser driver circuit 4 drives the semiconductor laser 21. A system controller 5 controls the whole data recording and playback device.

A beam splitter 22 divides the laser light emitted from the semiconductor laser 21 to pass through both a light source monitor 25 and a beam splitter 23. The recording light monitor 25 includes a photodetector to detect the laser light illuminating the optical recording medium 1. The laser light passes through an objective lens 24 to illuminate the optical recording medium 1. Laser light reflected from the optical recording medium 1 is reflected by the beam splitter 23 to be incident on a reflected light monitor 26. The reflected light monitor 26 includes a photodetector to detect the reflected light from the optical recording medium 1.

The operation of the above-described data recording and playback device according to a first preferred embodiment of the present invention is now described. The data recording and playback device uses a constant angular velocity (CAV) system in which the optical recording medium 1 is caused to rotate at a constant rate of rotation with no relation to the playback radial position. The system controller 5 causes the optical recording medium 1 to rotate at a constant rpm by a spindle motor (not shown in the drawing).

The recording and playback controller 3 controls the laser driver circuit 4 and causes the semiconductor laser 21 to generate a laser beam/light. A portion of the laser beam emitted from the semiconductor laser 21 is separated by the beam splitter 22 and is incident on the light source monitor 25.

The light source monitor 25 detects the light intensity of the laser beam. Based on the light intensity, the controller 3 controls the drive current of the semiconductor laser 21 via the laser driver circuit 4, such that the playback light intensity (i.e., the power of the laser light by which the optical recording medium 1 is illuminated during a playback operation to readout data) becomes a predetermined value.

The playback light intensity is set at a value such that the playback of data recorded at low density is possible as far as the temperature of medium 1 is in a range of the predetermined temperature. For example, if the optical recording medium 1 is a medium for readout use in the above-mentioned FAD system for super resolution readout, the playback light intensity is set to a small value such that the mask within the playback light spot practically does not occur. If the optical recording medium 1 was instead used in the above-mentioned RAD or CAD systems, the playback light intensity is set to a large value level at which a sufficiently large aperture is obtained in the playback light spot.

The system controller 5 performs focus control to adjust the focus. Focus control is effected by moving the objective lens 24 of the optical head 2 via a focus actuator (not shown in the drawing). Furthermore, in order to know where on the optical recording medium 1 the laser beam is directed, the system controller 5 performs tracking control by controlling a tracking actuator (not shown in the drawing) and causing the laser beam to follow a track of the optical recording medium 1.

The laser light emitted by the semiconductor laser 21 passes through the beam splitters 22 and 23, and the objective lens 24, and is incident on the optical recording medium 1. The light reflected from the optical recording medium 1 when illuminated with the playback light is split by the beam splitter 23 to be incident on the reflected light monitor 26. The reflected light monitor 26 generates signals corresponding to intensity of the reflected playback light. The recording and playback controller 3 receives the signals generated by the reflected light monitor 26 and identifies address data from the optical recording medium 1.

The system controller 5 performs a seek operation to cause the optical head 2 to move to the target location. The optical head 2 is moved by just the difference between the actual address obtained by the recording and playback controller 3 and the address of a control data area of the target location. At the place reached by the seek operation, tracking control is again performed, the address data is read out, and a determination is made whether the laser beam has reached the target address. If there is a displacement between the address which was read out and the target location, a step jump action is effected, causing the laser beam to move repeatedly.

When the control data area of the target location on the optical recording medium 1 has been reached, the recording and playback controller 3 reads out the data previously recorded in the control data area at a low density during manufacture of the medium. Such data include: (1) the optimum recording light intensity PWref (power of the laser light with which the optical recording medium 1 is illuminated during recording) when the temperature of the optical recording medium 1 has a standard (or reference) temperature Tref; (2) the rate of change R of this recording light intensity with respect to temperature; and (3) the optimum playback light intensity PRref when the temperature of the optical recording medium 1 has the reference temperature Tref and when a predetermined linear velocity (for example, the linear velocity of the innermost circumference) is V0. After the data have been read out from the control data area, the system controller 5 causes the laser beam to move to a test recording area of the optical recording medium 1 by seek or step-jump operations similar to the seek and step-jump operations discussed above.

The recording and playback controller 3 next performs a test recording operation by recording and playing back data in the test recording area, estimates the present temperature of the optical recording medium 1, calculates a corresponding optimum playback light intensity, and adjusts the optimum playback light intensity with respect to a linear velocity of the optical recording medium 1 if necessary. The operation of the recording and playback controller 3 is described with reference to FIGS. 2(a)–(f) and FIG. 3. FIG. 3 is a flowchart depicting a preferred embodiment of the processes performed by the recording and playback controller 3.

Figure 2A:
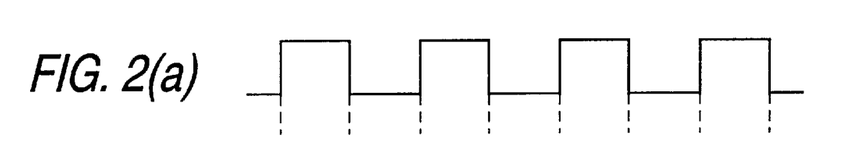
FIG. 2(a) is a diagram showing a binary recording signal used during a test recording procedure.
Figure 3:
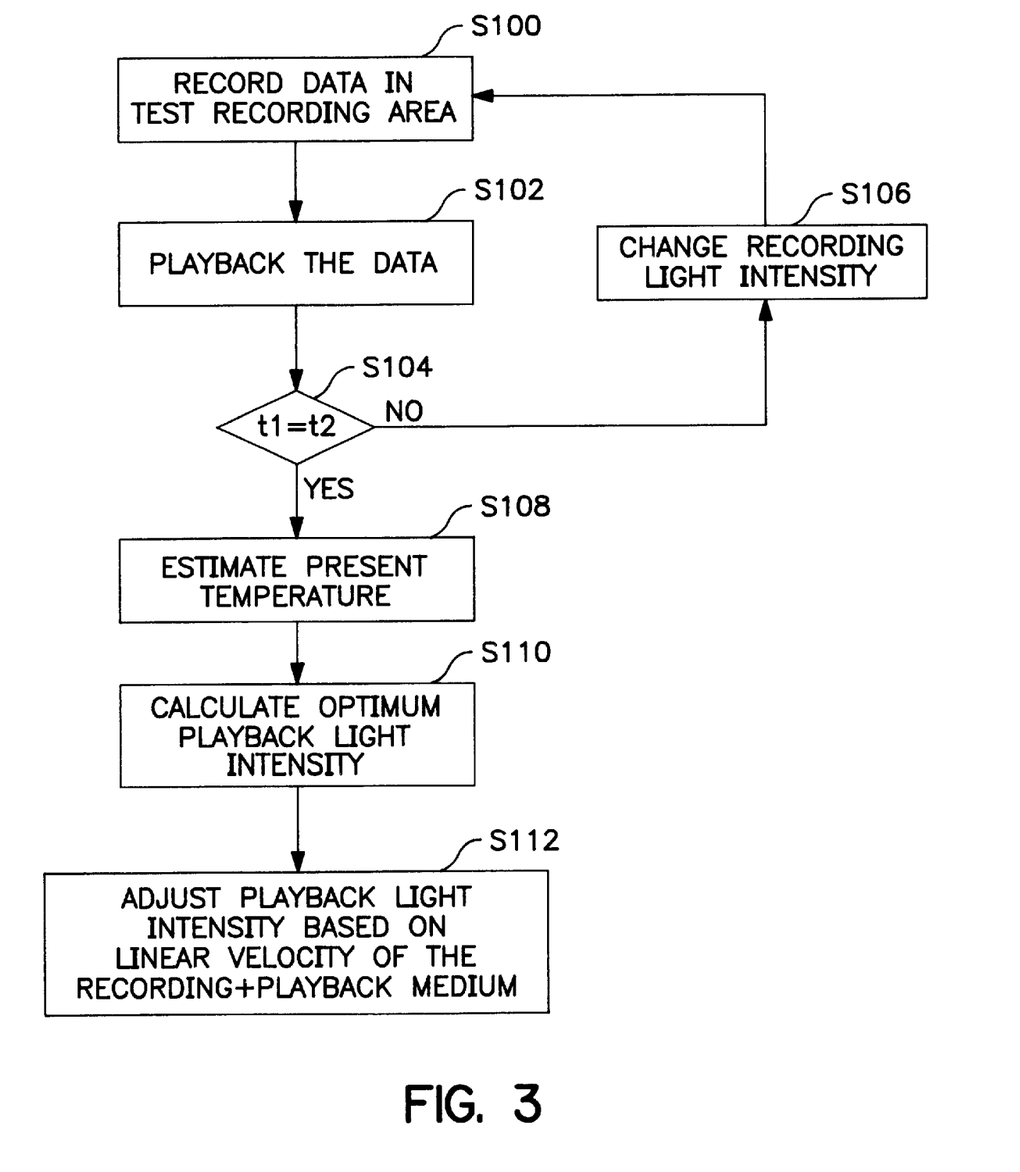
FIG. 3 is a flowchart depicting a process performed by the recording and playback controller 3 of FIG. 1 according to a preferred embodiment of the present invention.

First, the recording and playback controller 3 applies a recording signal having a frequency f0 and a duty ratio of fifty percent, as shown in FIG. 2(a), to the laser driver circuit 4. In addition, based on the light intensity which was determined via the light source monitor 25, the recording and playback controller 3 controls the laser driver circuit 4 such that the intensity of the recording light with which the optical recording medium 1 is illuminated becomes the optimum recording light intensity PWref. The frequency f0 is set to a frequency such that the marks recorded on the optical recording medium 1 are sufficiently longer than the laser beam diameter.

Figure 2B:
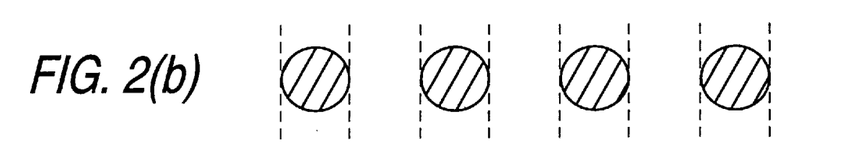
FIG. 2(b) is a diagram showing marks recorded on an optical recording medium corresponding to the binary recording signal depicted in FIG. 2(a).

The laser driver circuit 4 then applies a laser drive signal to the semiconductor laser 21, with the laser drive signal being formed according to the recording signal. Thus, recording marks (as shown in FIG. 2(b)) are recorded in the test recording area of the optical recording medium 1, corresponding to step S100 in FIG. 3.

Figure 2C:
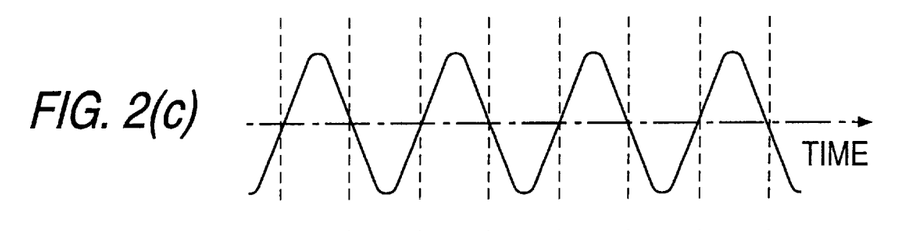
FIG. 2(c) is a diagram showing a playback signal waveform obtained by playing back the marks depicted in FIG. 2(b).

The recorded marks are played back in step S102. When the test recording area recorded in this manner is illuminated with playback light, a signal as shown in FIG. 2(c) is output by the reflected light monitor 26. By making the playback signal binary, a playback signal as shown in FIG. 2(d) is obtained.

Figure 2D:
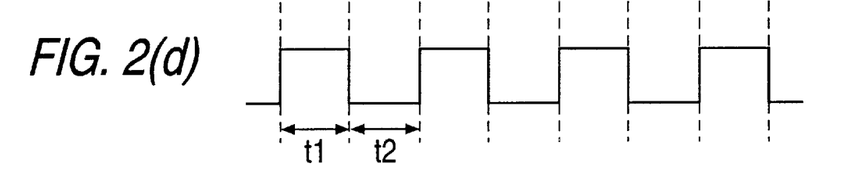
FIG. 2(d) is a diagram showing a binary version of the playback signal waveform depicted in FIG. 2(c).
Figure 2E:
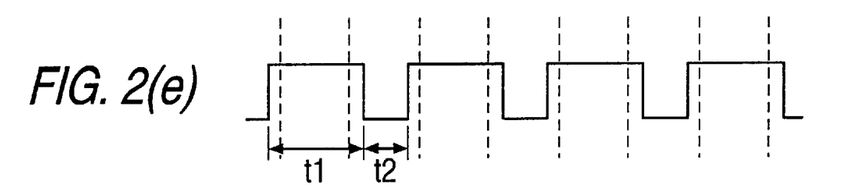
FIG. 2(e) is a diagram showing an example of a binary playback signal having a duty ratio greater than fifty percent when t1 is greater than t2.
Figure 2F:
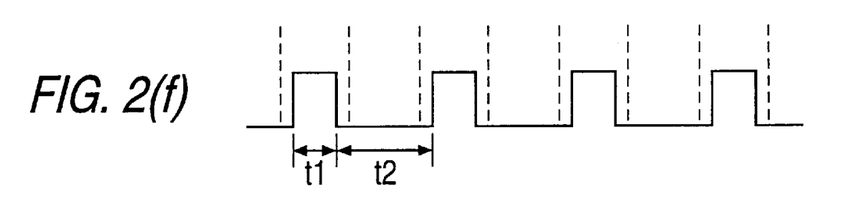
FIG. 2(f) is a diagram showing an example of a binary playback signal having a duty ratio less than fifty percent when t1 is less than t2.

In step S104, the recording and playback controller 3 checks the played back data to determine if a duty ratio of the playback signal is fifty percent (i.e., when t1 equals t2, as shown, for example, In FIG. 2(d)). If the duty ratio is greater or less than fifty percent, the recording and playback controller 3 changes the recording light intensity accordingly in step S106. A duty ratio is greater than fifty percent when t1 is greater than t2, as shown in FIG. 2(e). The recording and playback controller 3 reduces the intensity of the recording light and again performs test recording when the duty ratio is greater than fifty percent. On the other hand, when the duty ratio is less than fifty percent, (i.e., when t1 is less than t2, as shown in FIG. 2(f)), the recording and playback controller 3 performs the test recording again after increasing the intensity of the recording light.

By performing the test recording(s) and changing the intensity of the recording light in this manner, a recording light intensity is found at which the duty ratio of the playback signal becomes fifty percent. The recording light intensity found in this manner is the actual optimum recording light intensity PW.

Subsequently, the recording and playback controller 3 estimates the present temperature T of the optical recording medium 1 (step S108), as in the following Equation (1), from the optimum recording light intensity PWref, read out from the control data area, and its rate of change R with respect to its temperature, and the optimum recording intensity PW which was found from the test recording process described above.

$$T=\{(PWref-PW)/R\}+Tref \tag{1}$$

As an example, at a standard or reference temperature Tref of 25° C., when the optimum recording light intensity PWref is taken as 5.25 mW at this standard temperature of 25° C., rate of change R of this recording light intensity with respect to temperature is taken as 0.03 mW/° C., and the optimum recording light intensity PW, found from test recording, is taken as 4.95 mW, the temperature T of the optical recording medium 1 is estimated by Equation (1) to be 35° C.

In other words, Equation (1) is an equation that estimates the present temperature T of the optical recording medium 1 from the present optimum recording light intensity PW and the optimum recording light intensity PWref when the reference temperature is Tref.

Based on the temperature T of the optical recording medium 1 found in the above manner and on the optimum playback light intensity PRref read out from the control data area, the recording and playback controller 3 calculates the optimum playback light intensity PR1 at the present temperature T of the optical recording medium 1 (step S110) according to the following Equation (2).

$$PR1 = \{(Tr-T)/(Tr-Tref)\} \times PRref \quad (2)$$

When the optical recording medium 1 is a medium for super resolution readout use, Tr is the optimum temperature at which sufficient effect is obtained for super resolution playback. In the FAD system, Tr is set at the temperature at which a mask is formed within the playback light spot, that is, Tr is set at a temperature at which the direction of magnetization of the playback layer 34 reverses to the direction of the external magnetic field Hr when erasing the magnetization of the disconnection layer 33. Moreover, in the RAD system, Tr is set to the temperature at which an optimal form for the effective aperture is achieved within the light spot, that is, Tr is set at a temperature at which the direction of magnetization of the playback layer reverses to the direction of magnetization of the recording layer. In the CAD system, Tr is set at the temperature at which an optimal aperture is similarly formed, that is, Tr is set to a temperature at which the magnetization of the playback layer, directed in a direction within the surface, exhibits perpendicular magnetization.

When the optical recording medium 1 is a normal medium which is not used for super resolution readout, such as a magneto-optical disk and the like, the optimum temperature is set at which the C/N ratio of the playback signal becomes highest, for example, the temperature at which a decrease of the Kerr rotation angle begins to be marked.

The recording and playback controller 3 finds the linear velocity V of the optical recording medium 1 in the target location at the address, calculated by the system controller 5, where data is recorded to be played back according to instructions from a host computer (not shown in the drawing). The recording and playback controller 3 corrects the playback light intensity PR1 found by Equation (2) by calculating an optimum playback light intensity PR2 in the target location using the following Equation (3).

$$PR2 = (V/V0)^{1/2} \times PR1 \quad (3)$$

The playback light intensity is changed according to the linear velocity V of the optical recording medium 1 (step S112) because variations may occur in the temperature distribution of the optical recording medium 1 when the linear velocity varies, even with the same playback light intensity applied. By performing the correction of Equation (3), the temperature distribution of the optical recording medium 1 within the light spot can be made such that temperature distribution differences do not occur due to linear velocity variations. In the case of a Constant Linear Velocity (CLV) system, performance of the correction of Equation (3) is not necessary.

Based on the light intensity detected by the photodetector 25, the recording and playback controller 3 controls the laser driver circuit 4 such that the intensity of the playback light by which the medium 1 is illuminated becomes the calculated optimum playback light intensity PR2.

The system controller 5, by seek or step jump operations, then causes the laser beam to move to the target position which is to be played back. On reaching the target position, the recording and playback controller 3 recovers the signals generated by the reflected light monitor 26 and plays back the data.

The above-described calculation of the optimum playback light intensity, setting of the playback light intensity, seeking or step jumping, and playing back of data are repeated each time a target position to be played back is requested from instructions from the host computer, such as for performing readout of necessary successive data.

Figure 4:
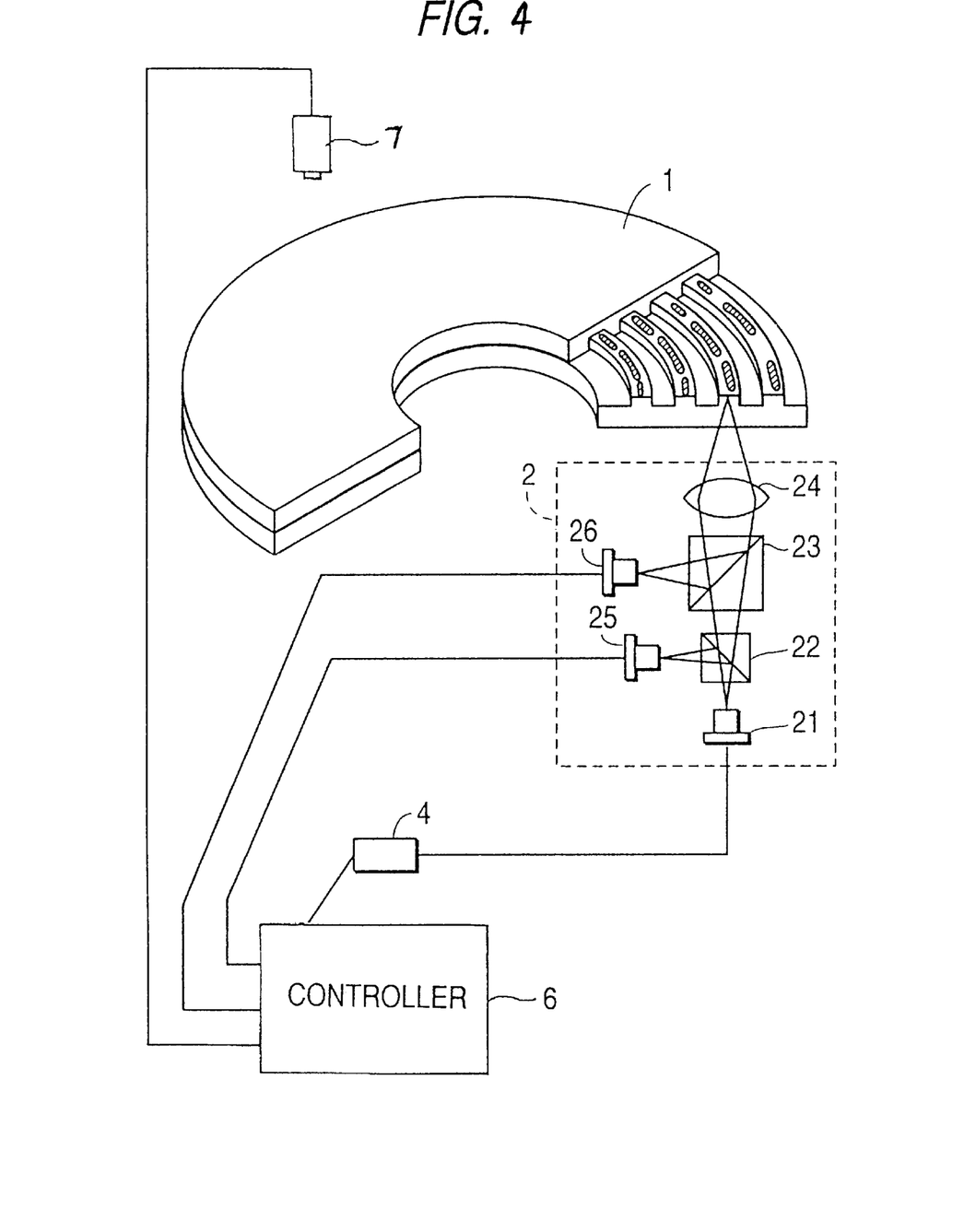
FIG. 4 is a block diagram depicting a data recording and playback device according to a second preferred embodiment of the present invention.

FIG. 4 is a block diagram of a data recording and playback device according to a second preferred embodiment of the present invention. Like elements corresponding to those discussed in the previously described embodiment have the same reference numerals and the repetitive descriptions of these like elements are accordingly omitted here.

The controller 6 performs the same functions and has the same characteristics as the previously described system controller 5 and the recording and playback controller 3. However, in contrast to the first preferred embodiment, the controller 6 of this second preferred embodiment does not perform a test recording to find the appropriate recording light intensity and does not estimate the temperature of the recording and playback medium 1 in the manner described for the recording and playback controller 3. Instead, the controller 6 controls a measurement of the temperature of the medium 1 via an infrared light temperature sensor 7.

The sensor 7 measures the temperature of the medium 1 at a location on the medium 1 which is unaffected by a temperature rise resulting from the laser light used for recording and playback. The sensor 7 is a non-contact type of infrared temperature sensor. However, the sensor 7 is not limited to this type of sensor, but may also be a contact type of temperature sensor. In addition, temperature measurement may be accomplished with methods including, but not limited to, detection of a thermal expansion of the surface of the medium 1, detection of a color of a thermo-label whose color changes with temperature, and like methods. Indirect temperature measurement may also be made, such as by measuring the temperature of the air in the data recording and playback device (or the space surrounding the medium 1), the temperature of a hub, cartridge, or other part belonging to the medium 1 which is not directly used in recording and playback of data. The temperature of the medium 1 may be estimated from such indirect temperature measurements. The measurement of the temperature of the medium 1 may also be made during both recording and during playback.

The controller 6 calculates the playback light intensity based on the measured temperature of the medium 1 (in contrast to the estimated temperature derived by the recording and playback controller 3) in accordance with Equation (4), which is similar to Equation (2) described above.

$$P = \{(Tr-T)/(Tr-25)\} \times Pn(25) \quad (4)$$

Here, T is the temperature of the medium 1 measured by means of the temperature sensor 7; Pn (25) is the optimum playback light speed at a temperature T of 25° C. and also when a predetermined linear velocity (for example, the linear velocity of the innermost circumference of the medium 1) is V0.

The controller 6 performs other functions performed by the recording and playback controller 3 and the system controller 5 described above. For instance, the controller 6 also corrects the playback light intensity P by calculating an optimum playback light intensity PR2 in the target location using Equation (3). The controller 6 controls the laser driver circuit 4 such that the intensity of the playback light by which the medium 1 is illuminated becomes the calculated optimum playback light intensity PR2. Moreover, the controller 6 controls the movement of the laser beam to the target position. Other features and characteristics discussed above regarding the recording and playback controller 3 and the system controller 5 (and not directed to the test recording operation or to estimation of the temperature of the medium by the recording and playback controller 3) also apply to the controller 6 and the repetitive descriptions of which are accordingly omitted here.

With the preferred embodiment of the present invention described above, data can be played back at the optimum playback light intensity so that the optimum C/N ratio for the playback signal is achieved even if the temperature of the recording and playback medium 1 changes. The recording and playback controller 3 finds the appropriate recording light intensity from the test recording operation and estimates the temperature of the medium 1 from the appropriate recording light intensity. Alternatively, the controller 6 directly measures the temperature of the medium 1 with the temperature sensor 7. Once the temperature of the medium is determined, the recording and playback controller 3 or the controller 6 appropriately adjusts the intensity of playback light according to the temperature of the medium (and, if necessary, the linear velocity of the medium as well). Thus, the temperature distribution of the recording and playback medium within the playback light spot is set at a predetermined temperature distribution, unrelated to the temperature of the medium itself and less susceptible to any problems associated with temperature variations in the medium or its surroundings.

Moreover, if the optical recording medium 1 is a medium for super resolution readout use, the optimal form of the effective aperture portion of the light spot responsible for super resolution playback may be achieved, without being affected by changes in the temperature of the medium itself. In addition, even when the temperature of the medium differs, data which have been recorded at high density can be stably read out. Furthermore, if the optical recording medium 1 is a normal medium (not used in super resolution readout), the highest C/N ratio of the playback signal may be easily and effectively obtained, without being affected by changes in the temperature of the medium itself, and the capacity of the optical recording medium 1 can be sufficiently made use of. Also, because the temperature of an optical recording medium in a data recording and playback device is normally not kept constant, the device is not made complicated due to heat generation countermeasures (and the like) by which the installation environmental temperature of the device is limited.

The present invention is not limited, however, to the preferred embodiments of the recording and playback device described above. Other preferred embodiments of the present invention are possible. For instance, in the above-described data recording and playback device, the value of the temperature T of the optical recording medium 1 may need to be refreshed on each occasion for test recording and estimation of the temperature of the optical recording medium 1. However, because the change of temperature of the optical recording medium 1 is normally slow, the estimation of temperature via the test recording may be performed at fixed times, the frequency of which may be set at a degree such that the amount of time needed for performing the estimation does not become a problem. Moreover, the temperature T of the medium may be determined by estimating the rate of change of the temperature from a current value (either estimated or measured) with a previous value (either estimated or measured), up to the next measurement or calculation for the temperature T.

The playback light intensity varies due to the linear velocity V in the target location of the optical recording medium 1 and in positions on the way to the target location. Thus, the playback light intensity at the target location may be set higher than the optimum light intensity of positions along the way to the target location (for example, when the target location is located more toward the circumference than the location of the present position). Consequently, in another preferred embodiment of the present invention, the playback light intensity may be set to a constant value during the seek or step jump operations and the optimum playback light intensity may be calculated after reaching the target location.

An optical recording medium for use in super resolution playback has been described above in relation to FAD, RAD, CAD and the like systems for magnetic super resolution magneto-optical disks. However, similar results can be obtained with other super resolution recording media, apart from magneto-optical disks.

It should be understood that although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording and playback device for recording and playing back data on a recording and playback medium, comprising:

a recording and playback controller to determine a playback light intensity at which a temperature distribution remains constant in a portion of the recording and playback medium illuminated by a playback light having the playback light intensity when a temperature of the recording and playback medium changes, wherein said recording and playback controller performs a test recording operation to determine a recording light intensity at which a duty ratio of a playback signal representing the playback light matches a duty ratio of the data to be recorded, estimates the temperature of the recording and playback medium based on the recording light intensity, and calculates the playback light intensity based on the temperature.

2. A recording and playback device as recited in claim 1, wherein said recording and playback controller performs the test recording operation by recording test data on the recording and playback medium, playing back the test data, and changing the recording light intensity if the duty ratio of the playback signal is greater or less than the duty ratio of the data to be recorded.

3. A recording and playback device as recited in claim 1, wherein said recording and playback controller estimates the temperature based on an optimum recording light intensity at a reference temperature, the reference temperature, a rate of change relationship between the recording light intensity and the temperature, and the recording light intensity determined during the test recording and playback operation on the recording and playback medium.

4. A recording and playback device as recited in claim 1, wherein said recording and playback controller calculates the playback light intensity of the playback light based on an optimum playback light intensity at a reference temperature, the reference temperature, a temperature for super resolution playback, and the estimated temperature of the recording and playback medium.

5. A data recording and playback device for recording and playing back data on a recording and playback medium, comprising:

an illumination device to illuminate the recording and playback medium with a recording light to record the data on the recording and playback medium or a playback light to read out data from the recording and playback medium;

a reflected light monitor to receive a reflected playback light from the recording and playback medium and to generate an electrical signal corresponding to the reflected playback light; and a recording and playback controller to determine a recording light intensity of the recording light based on the electrical signal from said reflected light monitor during a test recording and playback operation on the recording and playback medium, to estimate a temperature of the recording and playback medium based on the recording light intensity, and to calculate, based on the temperature, a playback light intensity of the playback light at which a temperature distribution remains constant in a portion of the recording and playback medium illuminated by the playback light when the temperature of the recording and playback medium changes.

6. A recording and playback device as recited in claim 5, wherein said recording and playback controller performs the test recording and playback operation by determining the recording light intensity at which a duty ratio of the reflected playback light matches a duty ratio of the data to be recorded.

7. A recording and playback device as recited in claim 6, wherein said recording and playback controller performs the test recording and playback operation by recording test data on the recording and playback medium, playing back the test data, and changing the recording light intensity if the duty ratio of the playback signal is greater or less than the duty ratio of the data to be recorded.

8. A recording and playback device as recited in claim 5, wherein said recording and playback controller adjusts the playback light intensity based on a linear velocity of the recording and playback medium.

9. A recording and playback device as recited in claim 5, wherein said recording and playback controller estimates the temperature based on an optimum recording light intensity at a reference temperature, the reference temperature, a rate of change relationship between the recording light intensity and the temperature of the recording and playback medium, and the recording light intensity determined during the test recording and playback operation on the recording and playback medium.

10. A recording and playback device as recited in claim 5, wherein said recording and playback controller calculates the playback light intensity of the playback light based on an optimum playback light intensity at a reference temperature, the reference temperature, a temperature for super resolution playback, and the temperature of the recording and playback medium.

11. A method of data playback from a recording and playback medium, comprising:

determining a playback light intensity at which a temperature distribution remains constant in a portion of the recording and playback medium illuminated by a playback light having the playback light intensity when a temperature of the recording and playback medium changes, wherein said determining includes:
finding a recording light intensity at which a duty ratio of a playback light signal representing the playback light matches a duty ratio of the data to be recorded;
estimating the temperature of the recording and playback medium based on the recording light intensity; and
calculating the playback light intensity based on the temperature.

12. A method as recited in claim 11, wherein said finding includes:

recording test data on the recording and playback medium;

playing back the test data; and changing the recording light intensity if the duty ratio of the playback signal is greater or less than the duty ratio of the data to be recorded.

13. A method as recited in claim 11, wherein said estimating is based on an optimum recording light intensity at a reference temperature, the reference temperature, a rate of change relationship between the recording light intensity and temperature, and the recording light intensity found from said finding.

14. A method as recited in claim 11, wherein said calculating is based on an optimum playback light intensity at a reference temperature, the reference temperature, a temperature for super resolution playback, and the temperature of the recording and playback medium.

15. A method of data playback from a recording and playback medium, comprising:

finding a recording light intensity at which a duty ratio of a playback light signal matches a duty ratio of the data to be recorded;

estimating a temperature of the recording and playback medium based on the recording light intensity; and calculating, based on the temperature, a playback light intensity at which a temperature distribution remains constant in a portion of the recording and playback medium illuminated by a playback light having the playback light intensity when the temperature of the recording and playback medium changes.

* * * * *